United States Patent
Wu et al.

(10) Patent No.: US 9,030,723 B2
(45) Date of Patent: May 12, 2015

(54) ASYMMETRIC TRAVEL FOR MEMS LIGHT MODULATOR

(71) Applicant: Pixtronix, Inc., San Diego, CA (US)

(72) Inventors: Joyce H. Wu, Somerville, MA (US); Jianru Shi, Haverhill, MA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/745,457

(22) Filed: Jan. 18, 2013

(65) Prior Publication Data

US 2014/0204097 A1    Jul. 24, 2014

(51) Int. Cl.
*G02B 6/26* (2006.01)
*G02B 26/02* (2006.01)
*G09G 3/34* (2006.01)
*G02B 26/08* (2006.01)

(52) U.S. Cl.
CPC .............. *G02B 26/02* (2013.01); *G09G 3/3433* (2013.01); *G02B 26/0841* (2013.01)

(58) Field of Classification Search
CPC ........ G02B 6/353; G02B 6/354; G02B 6/356; G02B 6/357; G02B 6/3544; G02B 6/3546; G02B 6/3552; G02B 6/3594; G02B 6/3584; G01J 3/04
USPC ......... 359/227, 230, 232, 233; 385/18, 25, 50
See application file for complete search history.

(56) References Cited

U.S. PATENT DOCUMENTS

| | | | |
|---|---|---|---|
| 5,513,031 A | 4/1996 | Vuilleumier et al. | |
| 5,794,761 A | 8/1998 | Renaud et al. | |
| 6,996,306 B2 | 2/2006 | Chen et al. | |
| 7,295,363 B2 | 11/2007 | Patel et al. | |
| 7,304,785 B2 * | 12/2007 | Hagood et al. | 359/290 |
| 8,223,197 B2 | 7/2012 | McDowall et al. | |
| 2010/0164928 A1 | 7/2010 | Shin et al. | |
| 2012/0306827 A1 | 12/2012 | Owaku | |
| 2012/0306830 A1 | 12/2012 | Kimura et al. | |
| 2013/0010341 A1 * | 1/2013 | Hagood et al. | 359/230 |
| 2013/0010344 A1 * | 1/2013 | Hagood et al. | 359/238 |
| 2013/0135193 A1 * | 5/2013 | Fike, III et al. | 345/156 |

OTHER PUBLICATIONS

Wang K., et al., "An electrostatic zigzag transmissive microoptical switch for MEMS displays," Journal of Microelectromechanical Systems, Feb. 2007, vol. 16 (1), pp. 141-142.
International Search Report and Written Opinion—PCT/US2014/011441—ISA/EPO—Apr. 22, 2014.

* cited by examiner

*Primary Examiner* — David N Spector
(74) *Attorney, Agent, or Firm* — Weaver Austin Villeneuve & Sampson

(57) ABSTRACT

Systems, apparatuses and methods are provided for increasing the aperture ratio of a display by increasing the total travel distance of respective light modulating bodies in a display while maintaining fast switching speeds. Increasing the total travel distance allows for a larger aperture ratio in a display, which provides greater power savings and increased display brightness. The total travel distance of a light modulating body includes the distance the body travels from an open position to a closed position, and vice-versa. In one example, the travel distance of a light modulating body (e.g., any of the light modulators as described above) is asymmetric: from a neutral position, the body travels a greater distance in a first direction than in a second direction.

29 Claims, 12 Drawing Sheets

ASYMMETRIC TRAVEL FOR MEMS LIGHT MODULATOR

TECHNICAL FIELD

This disclosure relates to the field of electromechanical devices, and more particularly, to light modulating bodies for displays.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, or other micromachining processes that etch away parts of substrates and/or deposited material layers, or that add layers to form electrical and electromechanical devices.

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Displays using mechanical light modulators have not yet demonstrated sufficiently attractive combinations of brightness, low power and high quality image characteristics.

One way to achieve higher brightness and greater power savings is to increase the aperture ratio of a given pixel or an array of pixels. Increasing the aperture ratio, however, may increase the travel distance of a mechanical light modulator across the larger aperture, thereby increasing the amount of time required for the mechanical light modulator to move from one position to another. This may cause undesirable decreases in light modulator switching speeds and negatively affect performance of the display. A need remains for high brightness, low-powered mechanically actuated displays having light modulators that can be driven at high switching speeds and at low voltages and provide for improved image quality.

SUMMARY

The systems, methods and devices of this disclosure each have several innovative aspects, no single one of which is solely responsible for the desirable attributes disclosed herein.

In one aspect, an electromechanical device includes a first actuator, a second actuator, and a body coupled between the first and second actuators where the body is movable between a first position, a second position, and a neutral position between the first and second positions. A first distance between the neutral position and the first position is greater than a second distance between the neutral position and the second position.

In some configurations, the body moves the first distance away from the first actuator and moves the second distance toward the first actuator. The device may include an aperture and a light source. In the first position, the body may allow light from the light source to pass through the aperture, and in the second position the body at least partially blocks light from the light source from passing through the aperture.

In some configurations, when the body is in the neutral position, the body at least partially blocks light from passing through the aperture. The body may travel a greater distance in relation to the aperture when moving from the neutral position to the first position than when moving from the neutral position to the second position. In some configurations, the time for moving the body from the second position to the first position is greater than a time for moving the body from the first position to the second position.

In certain implementations, the first actuator includes a first compliant electrode connected between the body and a first set of anchors and a first electrode opposing the first compliant electrode that is connected to a first electrode anchor. The actuators include a second actuator having a second compliant electrode connected between the body and a second set of anchors. A second electrode opposes the second compliant electrode and is connected to a second electrode anchor such that a distance between the second compliant electrode and the second electrode anchor is greater than a distance between the first compliant electrode and the first electrode anchor.

In some configurations, the length of the second compliant electrode is greater than a length of the first compliant electrode. The body may include a shutter. The device may include a substrate where the shutter moves transverse to the substrate. The first and second actuators may include electrostatic actuators. In some implementations, the device includes an array of first actuators, second actuators and bodies coupled between the respective first actuators and second actuators arranged in pixels in a display. The device also includes a processor that is configured to communicate with the display where the processor is configured to process image data. The device further includes a memory device that is configured to communicate with the processor. In certain implementations, the aperture ratio of the display is greater than a display having the first distance equal to the second distance. The device may include a control matrix arranged to apply a first voltage to the first actuator and a second voltage to the second actuator, where the first voltage is different than the second voltage.

In some configurations, the device includes a driver circuit configured to send at least one signal to the display and a controller configured to send at least a portion of the image data to the driver circuit. The device also includes an image source module configured to send the image data to the processor, where the image source module includes at least one of a receiver, transceiver, and transmitter. The device may also include an input device configured to receive input data and to communicate the input data to the processor.

In another aspect, an apparatus includes a first actuator means and a second actuator means for moving a light modulating means coupled between the first and second actuator means. The light modulating means is movable between a first position, a second position, and a neutral position between the first and second positions. A first distance to move the light modulating means between the neutral position and the first position is greater than a second distance to move the light modulating means between the neutral position and the second position.

In some configurations, the light modulating means moves the first distance away from the first actuator means, and moves the second distance toward the first actuator means. The apparatus may also include an aperture means for passing light. In the first position, the light modulating means allows light to pass through the aperture means, and in the second position the light modulating means at least partially blocks light from passing through the aperture means. In the neutral position, the light modulating means at least partially blocks light from passing through the aperture means. In some implementations, the time for moving the light modulating means from the second position to the first position is greater than a time for moving the light modulating means from the first position to the second position.

In some configurations, the first actuator means includes a first compliant electrode means connected between the light modulating means and first set of anchor means, a first electrode means opposing the first compliant electrode means and connected to a first electrode anchor means. The second actuator means includes a second compliant electrode means connected between the light modulating means and second set of anchor means and a second electrode means opposing the second compliant electrode means and connected to a second electrode anchor means. In certain implementations, a distance between the second compliant electrode means and the second electrode anchor means is greater than a distance between the first compliant electrode means and the first electrode anchor means. In some configurations, the length of the second compliant electrode means is greater than a length of the first compliant electrode means. The apparatus may include a substrate means, wherein the light modulating means moves transverse to the substrate means.

In yet another aspect, an electromechanical device includes a substrate having an aperture, a light source for providing light, a first actuator, a second actuator, and a body coupled between the first and second actuators. The body may be movable relative to the aperture between a first position for allowing light from the light source to pass through the aperture, a second position for at least partially blocking the light from passing through the aperture, and a neutral position between the first and second positions. A first distance between the neutral position and the first position may be greater than a second distance between the neutral position and the second position.

Details of one or more implementations of the subject matter described in this disclosure are set forth in the accompanying drawings and the description below. Although the examples provided in this disclosure are primarily described in terms of EMS and MEMS-based displays, the concepts provided herein may apply to other types of displays such as liquid crystal displays (LCDs), organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

The foregoing discussion will be understood more readily from the following detailed description with reference to the following drawings

DETAILED DESCRIPTION

Figure 1:
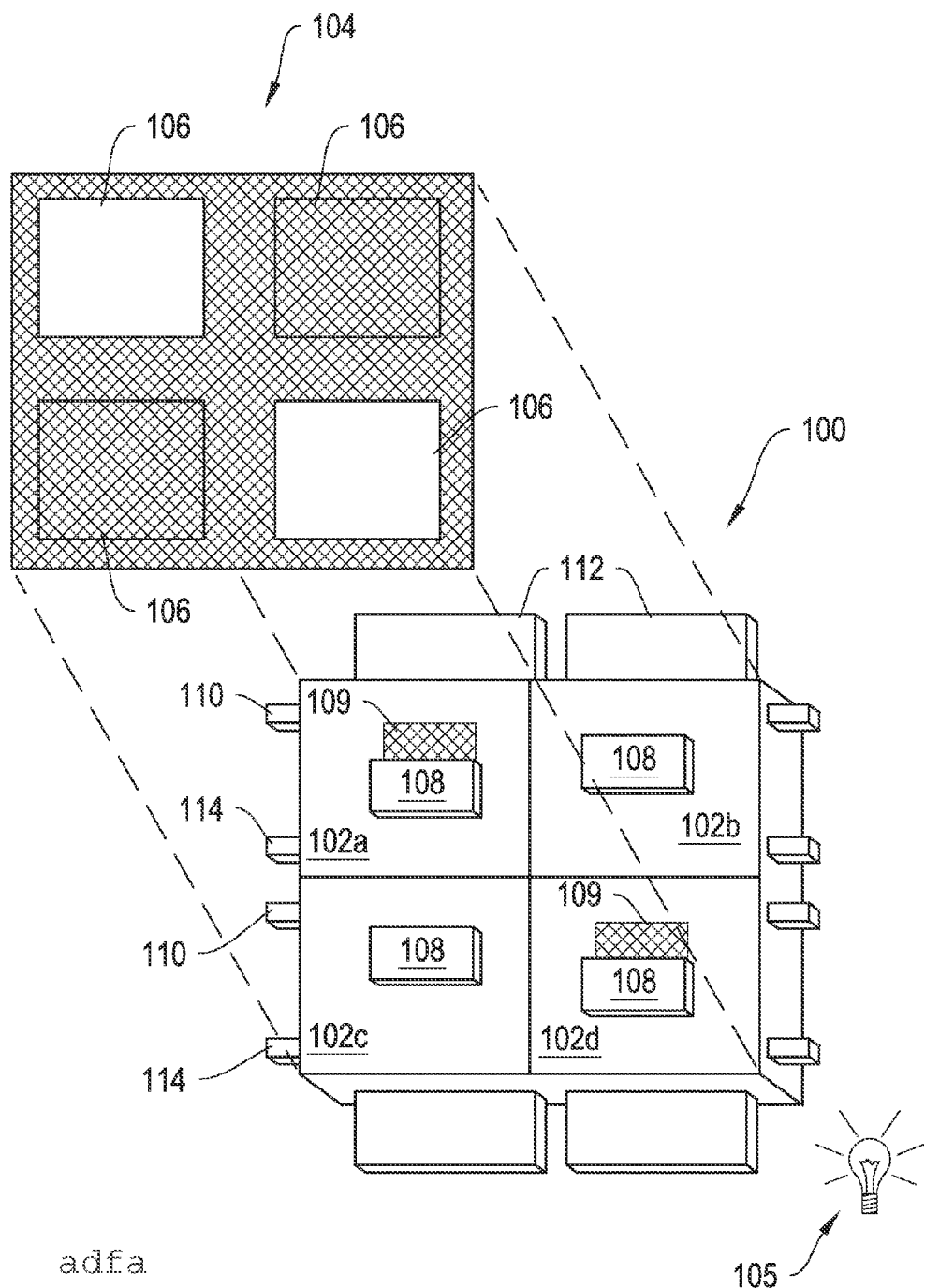
FIG. 1 is an isometric view of an example display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/ navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

To improve imaging characteristics (e.g., contrast ratio, image sharpness and color purity) for a display device, the light modulator transition time (e.g., moving the light modulator from an open position to a closed position) may be shortened. For example, a shortened light modulator transition time from an open position to a closed position reduces the risk that light leaks out of a pixel before the corresponding light modulator reaches a fully closed state. Systems, apparatuses and methods are provided herein for increasing the aperture ratio of a display by increasing the total travel distance of respective light modulating bodies in a display while preventing shutter transition time from increasing to a point where imaging quality would otherwise decrease. Increasing the total travel distance allows for a larger aperture ratio in a display, which provides greater power savings and increased display brightness. The total travel distance of a light modulating body includes the distance the body travels from an open position to a closed position, and vice-versa. In one example, the travel distance of a light modulating body is asymmetric: from a neutral position, the body travels a greater distance in a first direction than in a second direction. Asymmetric travel allows for a device to be designed with a longer travel distance without affecting or increasing the transition time, at least in one direction. In one implementation, use of the asymmetric shutter travel configuration can allow for power savings without affecting or increasing the transition time in one direction when using a lower voltage to drive the light modulator.

To provide an overall understanding of the application, certain illustrative implementations will now be described, including apparatus and methods for displaying images. However, it will be understood by one having ordinary skill in the art that the systems and methods described herein may be adapted and modified as is appropriate for the application being addressed and that the systems, apparatuses and methods described herein may be employed in other suitable applications, and that such other additions and modifications will not depart from the scope hereof.

FIG. 1 is a schematic diagram of one example of a display that may include bodies that move different distances with respect to a neutral position when traveling in a first direction than when traveling in a second direction with respect to an aperture. More particularly, FIG. 1 depicts a direct-view MEMS-based display apparatus 100. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105, or another light source. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight. In one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics. The user sees an image by looking directly at the display apparatus 100. In alternate implementations the display apparatus 100 is incorporated into a projection display. In such implementations, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display implementations are often built onto transparent or glass substrates to facilitate a sandwich assembly arrangement where one substrate, containing the light modulators, is positioned directly on top of the backlight. In some transmissive display implementations, a color-specific light modulator is created by associating a color filter material with each modulator 102. In other transmissive display implementations colors can be generated, as described below, using a field sequential color method by alternating illumination of lamps with different primary colors.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material.

The light modulator array 102a-102d is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 109, which are associated with each of the light modulators, have unequal areas.

In other implementations, a roller-based light modulator, a the light tap, an electrowetting-based light modulation array, as well as other light modulators, can be substituted for the shutter assembly 108 within the light modulator array 102a-102d.

Optionally, the display 100 maintains the shutters 108 in a layer of water (or other transparent conductive or polar fluid) or a layer of oil. The fluid can increase switching speeds and reduce stiction.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate drive voltages, which are typically higher in magnitude than the data voltages, to the light modulators 102. The application of these drive voltages then results in the electrostatic driven movement of the shutters 108. The control matrix may also include circuitry such as described later herein with respect to FIG. 3. The circuitry may include, without limitation, a transistor and a capacitor associated with each shutter assembly. In certain implementations, the gate of each transistor is electrically connected to a scan-line interconnect of a row in an array of pixels. In one configuration, the source of each transistor is electrically connected to its corresponding data interconnect. The actuators of each shutter assembly may include two electrodes. The drain of each transistor may be electrically connected in parallel to one electrode of a corresponding capacitor and to one of the electrodes of the corresponding actuator. The other electrode of the capacitor and the other electrode of the actuator associated with a shutter assembly may be connected to a common or ground potential. In alternate implementations, a transistor can be replaced with semiconductor diodes and or metal-insulator-metal sandwich type switching elements.

Figure 2:
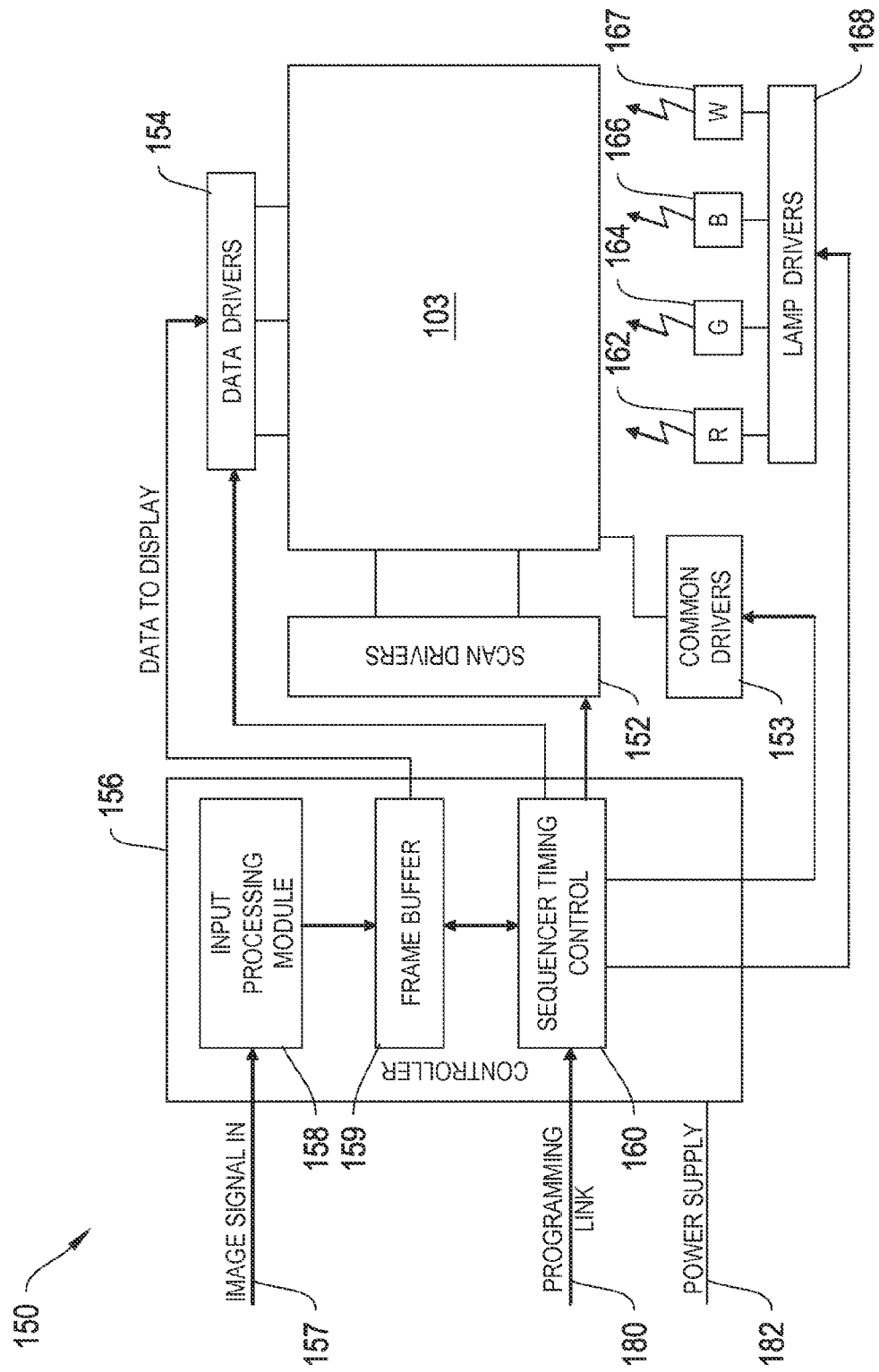
FIG. 2 is a block diagram of the display apparatus of FIG. 1.

FIG. 2 is a block diagram 150 of the display apparatus 100. Referring to FIGS. 1 and 2, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some implementations of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 (e.g., the shutters may be partially opened) and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some implementations the common drivers 153 provide a DC common potential to all light modulators within the array of light modulators 103, for instance by supplying voltage to a series of common interconnects 114. In other implementations the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. New images 104 can be set at periodic intervals. For instance, for video displays, the color images 104 or frames of video are refreshed at frequencies ranging from 10 to 300 Hertz. In some implementations, the setting of an image frame to the array 103 is synchronized with the illumination of the lamps 162, 164, and 166 such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In some implementations of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1,2,4,8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108. For instance, the time division techniques described above can be combined with the use of multiple shutters 108 per pixel, or the gray scale value for a particular sub-frame image can be established through a combination of both sub-frame timing and lamp intensity.

In some implementations, the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations, the sequence of selected rows is pseudo-randomized, in order to minimize visual artifacts. In further implementations, the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements.

In alternative implementations, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The display 100 includes of a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate. In some implementations the substrate is transparent, e.g., glass or plastic. In other implementations, multiple circuits, drivers, processors, and/or control functions from block diagram 150 may be integrated together within a single silicon chip, which is then bonded directly to the substrate holding pixel array 103.

The controller 156 includes a programming link 180 by which the addressing, color, and/or gray scale algorithms, which are implemented within controller 156, can be altered according to the needs of particular applications. In some implementations, the programming link 180 conveys information from environmental sensors, such as ambient light or temperature sensors, so that the controller 156 can adjust imaging modes or backlight power in correspondence with environmental conditions. The controller 156 also includes a power supply input 182 which provides the power needed for lamps as well as light modulator actuation. Where necessary, the drivers 152, 153, 154, and/or 168 may include or be associated with DC-DC converters for transforming an input voltage at 182 into various voltages sufficient for the actuation of shutters 108 or illumination of the lamps, such as lamps 162, 164, 166, and 167.

Figure 3:
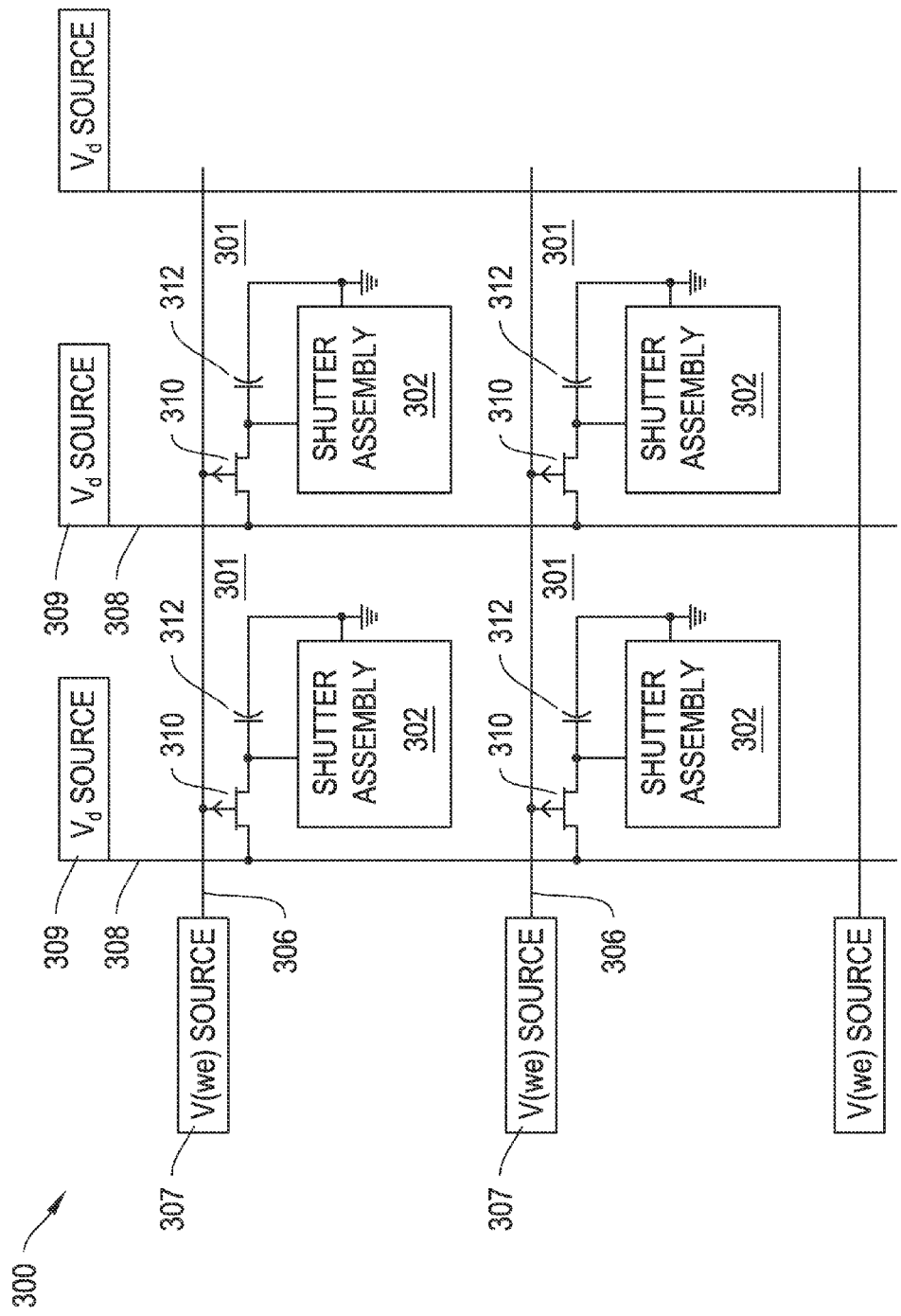
FIG. 3 is a schematic diagram of a control matrix suitable for controlling the light modulators incorporated into the display of FIG. 1.

FIG. 3 is a schematic diagram of a control matrix 300 suitable for communication with controller 156 and for controlling the light modulators incorporated into the display apparatus 100 of FIG. 1. The control matrix 300 may address an array of pixels 301, such as array of pixels 102a-102d of display 100, or array of pixels 103 of block diagram 150 (the "array"). Each pixel may include a shutter assembly 302 controlled by an actuator. In certain implementations, each pixel includes a dual-actuator shutter assembly. In other implementations, each pixels includes a single-actuator "elastic" assembly. Each pixel also includes an aperture layer that includes apertures, such as apertures 109 of display 100.

The control matrix 300 may be fabricated as a diffused or thin-film-deposited electrical circuit on the surface of a substrate on which the shutter assemblies 108 are formed. The control matrix 300 may include a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307, such as scan drivers 152, to the pixels 301 in a corresponding row of pixels 301. Each data interconnect 308 electrically connects a data voltage source, ("Vd source") 309, such as data drivers 154, to the pixels 301 in a corresponding column of pixels 301. In control matrix 300, the data voltage $V_d$ provides the majority of the energy necessary for actuation of the shutter assemblies 302. Thus, the data voltage source 309 also serves as a drive voltage source.

For each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The shutter assembly 302 together with corresponding actuators can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with corresponding actuators can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring, or the opposing force may be exerted by an opposing actuator, such as an "open" or "closed" actuator.

Figure 4A:
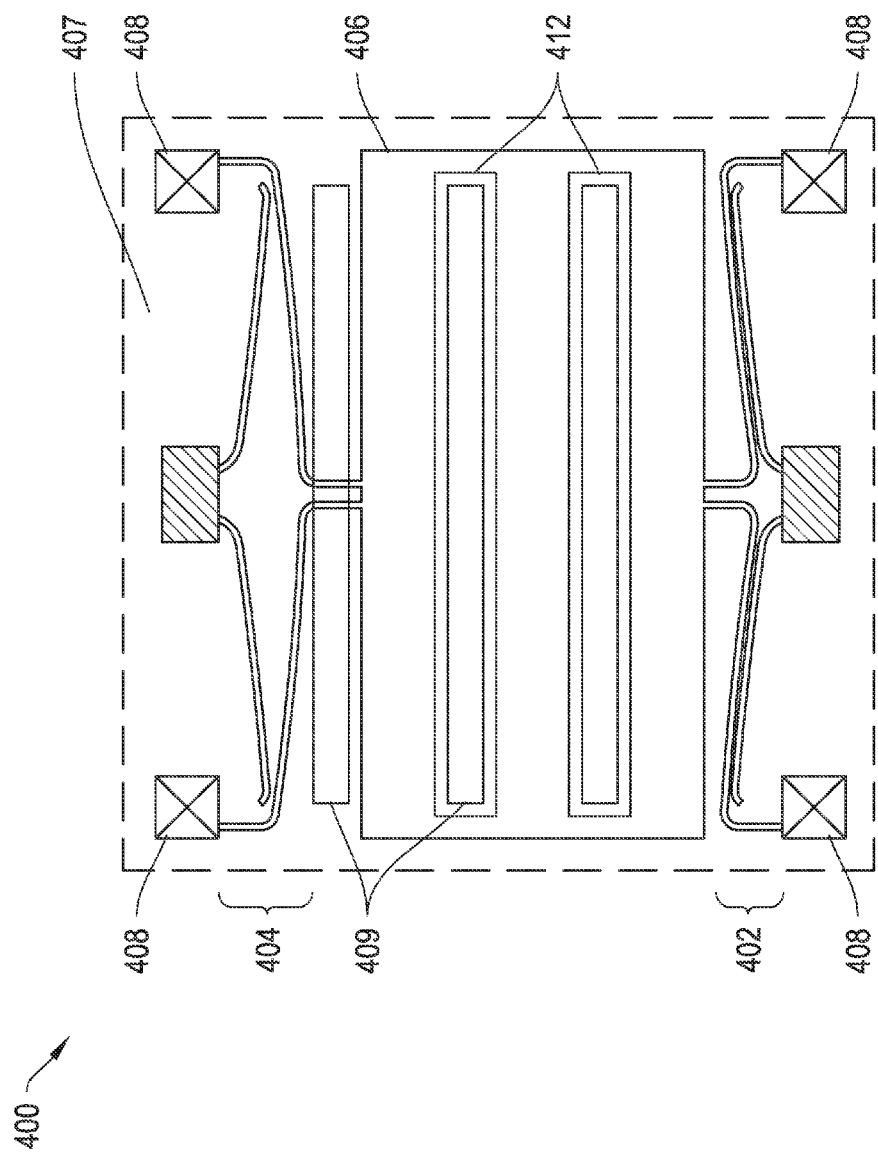
FIGS. 4A and 4B are plan views of a dual-actuated shutter assembly in the open and closed states respectively.
Figure 4B:
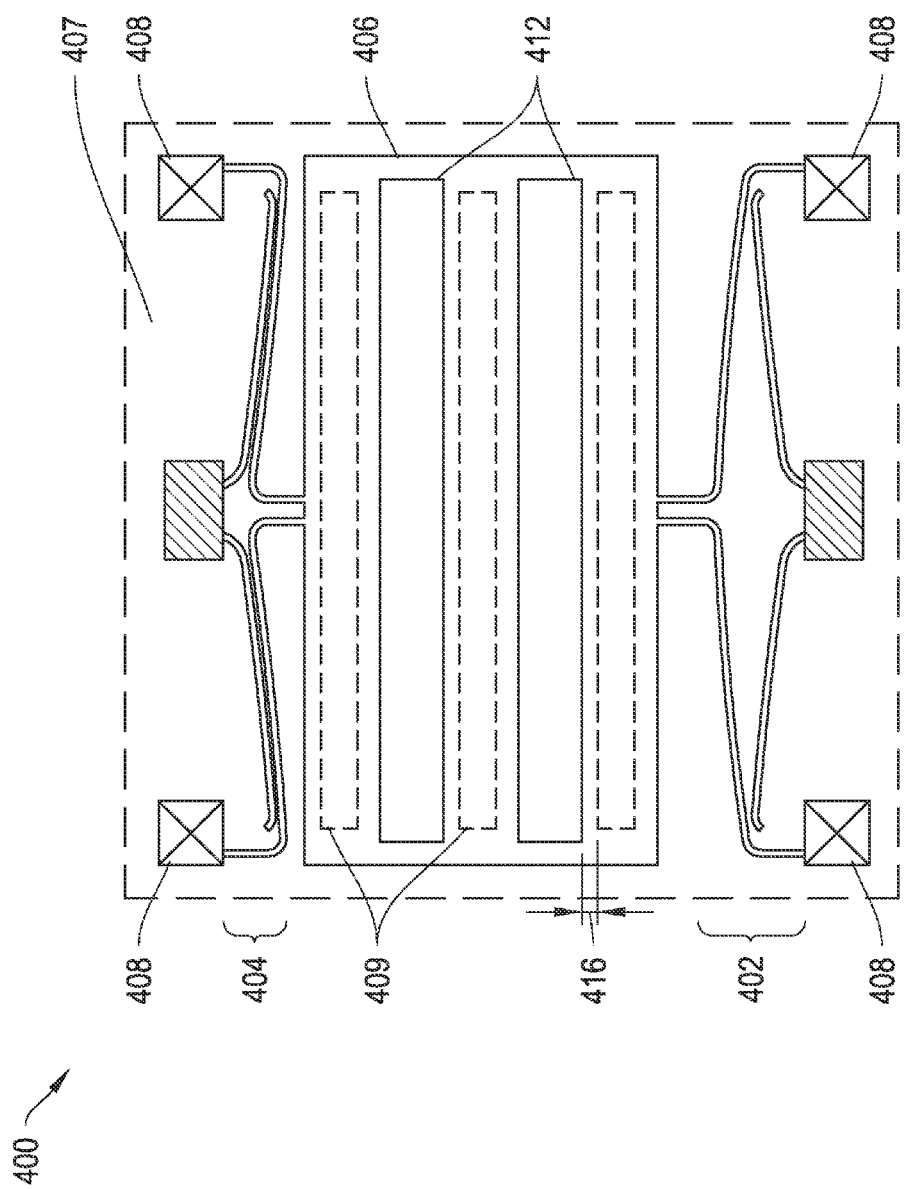

FIGS. 4A and 4B illustrate in more detail a shutter-based light modulator (shutter assembly) 400 suitable for inclusion in various implementations. The shutter assembly 400 may include an electromechanical-based shutter. The light modulator 400 is an example of a dual actuator shutter assembly, and is shown in FIG. 4A in an open state. FIG. 4B is a view of the dual actuator shutter assembly 400 in a closed state. Shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. A control matrix suitable for use with shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of apertures 412 and 409 coincide. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (shown as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, the light blocking portions of the shutter 406 may be arranged to overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after a drive voltage is applied to the opposing actuator. The minimum voltage needed to maintain a shutter's position against such an opposing force is referred to as a maintenance voltage $V_m$.

Figure 5:
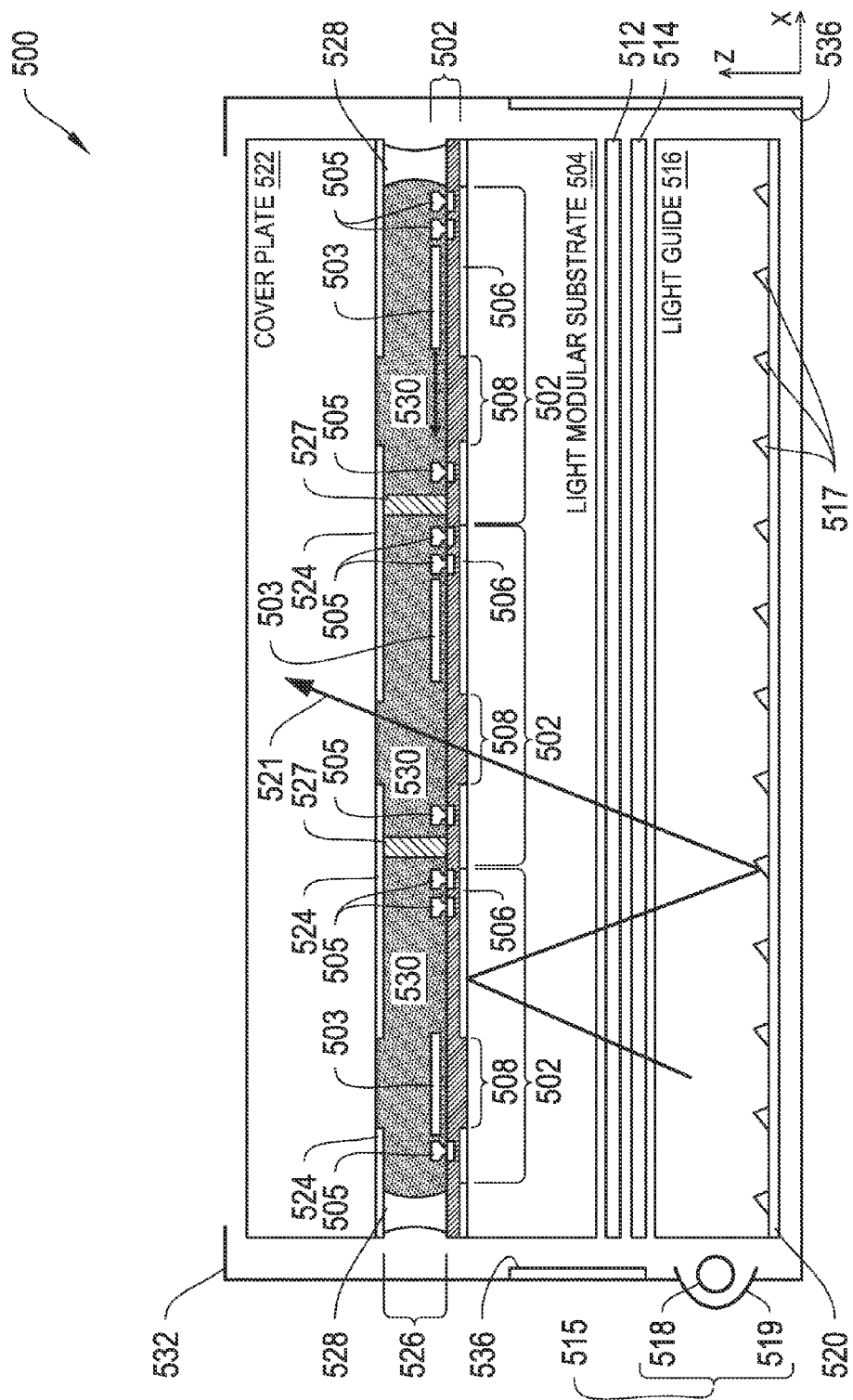
FIG. 5 is a cross-sectional view of a shutter-based display apparatus.

FIG. 5 is a cross sectional view of a display apparatus 500 incorporating shutter-based light modulators (shutter assemblies) 502. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, and may be made of transparent material, such as plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror is fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap may be less than the lateral overlap between the edge of shutters 503 and the edge of apertures 508 in the closed state, such as the overlap 416 shown in FIG. 4B.

The display apparatus 500 includes an optional diffuser 512 and/or an optional brightness enhancing film 514 which separate the substrate 504 from a planar light guide 516. The light guide includes a transparent material, e.g. glass or plastic. The light guide 516 is illuminated by one or more light sources 518, forming a backlight. The light sources 518 can be, for example, and without limitation, incandescent lamps, fluorescent lamps, lasers, or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In alternate implementations, the aperture layer 506 can be made of a light absorbing material, and in alternate implementations the surfaces of shutter 503 can be coated with either a light absorbing or a light reflecting material. In alternate implementations the aperture layer 506 can be deposited directly on the surface of the light guide 516. In alternate implementations the aperture layer 506 need not be disposed on the same substrate as the shutters 503 and anchors 505 (see the "MEMS-down" configuration described below).

In one implementation the light sources 518 can include lamps of different colors, for instance, the colors red, green, and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps or red, green, blue, and yellow lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a working fluid 530. The working fluid 530 is engineered with viscosities that may be below about 10 centipoise and with relative dielectric constant that may be above about 2.0, and dielectric breakdown strengths above about $10^4$ V/cm. The working fluid 530 can also serve as a lubricant. In one implementation, the working fluid 530 is a hydrophobic liquid with a high surface wetting capability. In alternate implementations the working fluid 530 has a refractive index that is either greater than or less than that of the substrate 504.

When the MEMS-based display assembly includes a liquid for the working fluid 530, the liquid at least partially surrounds the moving parts of the MEMS-based light modulator. In order to reduce the drive voltages, the liquid has a viscosity that may be below 70 centipoise, or even below 10 centipoise. Liquids with viscosities below 70 centipoise can include materials with low molecular weights: below 4000 grams/mole, or in some cases below 400 grams/mole. Suitable working fluids 530 include, without limitation, de-ionized water, methanol, ethanol and other alcohols, paraffins, olefins, ethers, silicone oils, fluorinated silicone oils, or other natural or synthetic solvents or lubricants. Useful working fluids can be polydimethylsiloxanes, such as hexamethyldisiloxane and octamethyltrisiloxane, or alkyl methyl siloxanes such as hexylpentamethyldisiloxane. Useful working fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. And other fluids considered for these display assemblies include butyl acetate, dimethylformamide.

For many implementations, it is advantageous to incorporate a mixture of the above fluids. For instance mixtures of alkanes or mixtures of polydimethylsiloxanes can be useful where the mixture includes molecules with a range of molecular weights. It is also possible to optimize properties by mixing fluids from different families or fluids with different properties. For instance, the surface wetting properties of a hexamethyldisiloxane and be combined with the low viscosity of butanone to create an improved fluid.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not shown in FIG. 5 are electrical interconnects which provide control signals as well as power to the shutter assemblies 502 and the lamps 518.

Display apparatus 500 is referred to as the MEMS-up configuration, where the MEMS based light modulators are formed on a front surface of substrate 504, i.e. the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e. the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures may be less than 10 microns, or a distance that is less than the overlap between shutters and apertures, such as overlap 416.

Figure 6A:
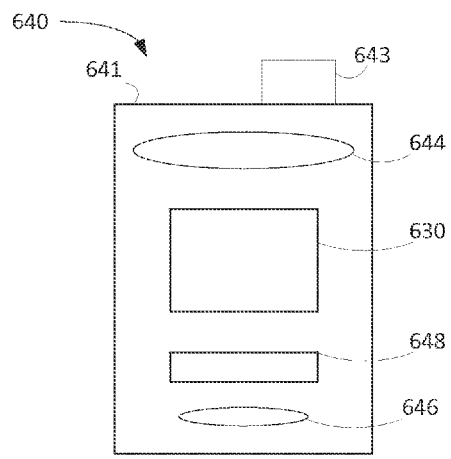
FIGS. 6A and 6B are system block diagrams illustrating a display device that includes a plurality of light modulator display elements.
Figure 6B:
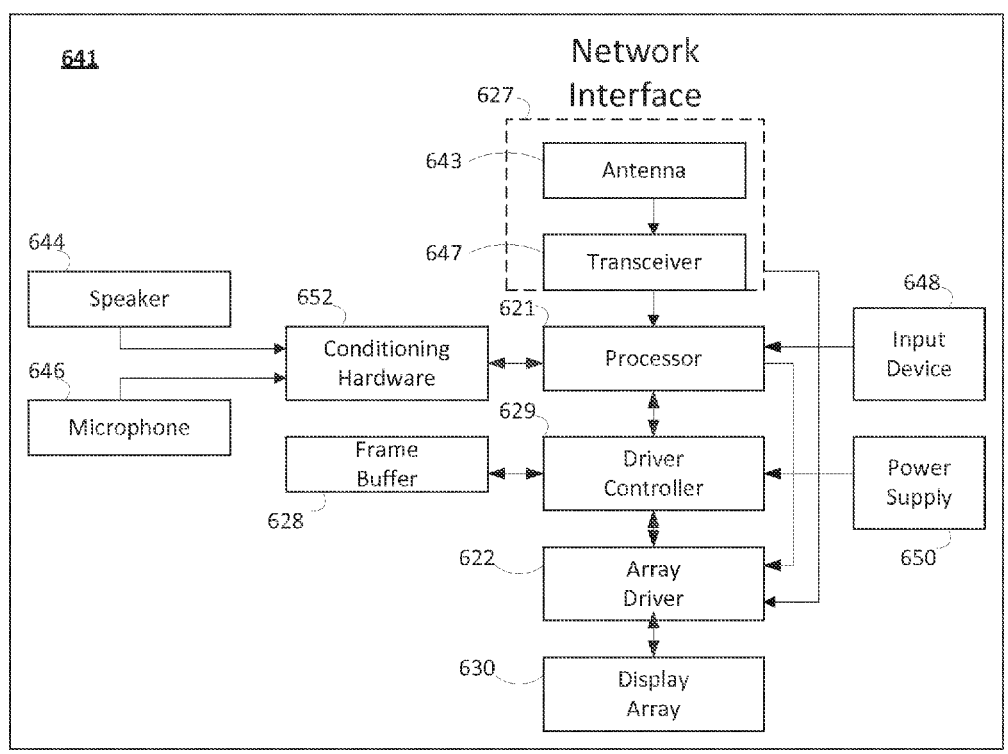

The displays described herein may be included in handheld devices, e-readers, wireless devices, or any device that employs a display to present information. FIGS. 6A and 6B are system block diagrams illustrating an example of display device 640 that includes a plurality of light modulator display elements as described herein. The display device 640 can be, for example, a smart phone, a cellular or mobile telephone. However, the same components of the display device 640 or slight variations thereof are also illustrative of various types of display devices such as televisions, computers, tablets, e-readers, hand-held devices and portable media devices.

The display device 640 includes a housing 641, a display 630, an antenna 643, a speaker 644, an input device 648 and a microphone 646. The housing 641 can be formed from any of a variety of manufacturing processes, including injection molding, and vacuum forming. In addition, the housing 641 may be made from any of a variety of materials, including, but not limited to: plastic, metal, glass, rubber and ceramic, or a combination thereof. The housing 641 can include removable portions (not shown) that may be interchanged with other removable portions of different color, or containing different logos, pictures, or symbols.

The display 630 may be any of a variety of displays, including a bi-stable or analog display, as described herein. The display 630 also can be configured to include, for example, a flat-panel display, such as plasma, EL, OLED, STN LCD, or TFT LCD, or a non-flat-panel display, such as a CRT or other tube device. In addition, the display 630 can include an light modulator-based display, as described herein.

The components of the display device 640 are schematically illustrated in FIG. 6B. The display device 640 includes a housing 641 and can include additional components at least partially enclosed therein. For example, the display device 640 includes a network interface 627 that includes an antenna 643 which can be coupled to a transceiver 647. The network interface 627 may be a source for image data that could be displayed on the display device 640. Accordingly, the network interface 627 is one example of an image source module, but the processor 621 and the input device 648 also may serve as an image source module. The transceiver 647 is connected to a processor 621, which is connected to conditioning hardware 652. The conditioning hardware 652 may be configured to condition a signal (such as filter or otherwise manipulate a signal). The conditioning hardware 652 can be connected to a speaker 645 and a microphone 646. The processor 621 also can be connected to an input device 648 and a driver controller 629. The driver controller 629 can be coupled to a frame buffer 628, and to an array driver 622, which in turn can be coupled to a display array 630. One or more elements in the display device 640, including elements not specifically depicted in FIGS. 6A and 6B, can be configured to function as a memory device and be configured to communicate with the processor 621. In some implementations, a power supply 650 can provide power to substantially all components in the particular display device 640 design.

The network interface 627 includes the antenna 643 and the transceiver 647 so that the display device 640 can communicate with one or more devices over a network. The network interface 627 also may have some processing capabilities to relieve, for example, data processing requirements of the processor 621. The antenna 643 can transmit and receive signals. In some implementations, the antenna 643 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 643 transmits and receives RF signals according to the Bluetooth® standard. In the case of a cellular telephone, the antenna 643 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 647 can pre-process the signals received from the antenna 643 so that they may be received by and further manipulated by the processor 621. The transceiver 647 also can process signals received from the processor 621 so that they may be transmitted from the display device 640 via the antenna 643.

In some implementations, the transceiver 647 can be replaced by a receiver. In addition, in some implementations, the network interface 627 can be replaced by an image source, which can store or generate image data to be sent to the processor 621. The processor 621 can control the overall operation of the display device 640. The processor 621 receives data, such as compressed image data from the network interface 627 or an image source, and processes the data into raw image data or into a format that can be readily processed into raw image data. The processor 621 can send the processed data to the driver controller 629 or to the frame buffer 628 for storage. Raw data typically refers to information that identifies the image characteristics at each location within an image. For example, such image characteristics can include color, bit depth, saturation and gray-scale level.

The processor 621 can include a microcontroller, CPU, or logic unit to control operation of the display device 640. The conditioning hardware 652 may include amplifiers and filters for transmitting signals to the speaker 645, and for receiving signals from the microphone 646. The conditioning hardware 652 may be discrete components within the display device 640, or may be incorporated within the processor 621 or other components.

The driver controller 629 can take the raw image data generated by the processor 621 either directly from the processor 621 or from the frame buffer 628 and can re-format the raw image data appropriately for high speed transmission to the array driver 622. In some implementations, the driver controller 629 can re-format the raw image data into a data flow having a raster-like format, such that it has a time order suitable for scanning across the display array 630. Then the driver controller 629 sends the formatted information to the array driver 622. Although a driver controller 629, such as an LCD controller, is often associated with the system processor 621 as a stand-alone Integrated Circuit (IC), such controllers may be implemented in many ways. For example, controllers may be embedded in the processor 621 as hardware, embedded in the processor 621 as software, or fully integrated in hardware with the array driver 622.

The array driver 622 can receive the formatted information from the driver controller 629 and can re-format the video data into a parallel set of waveforms that are applied many times per second to the hundreds, and sometimes thousands (or more), of leads coming from the display's x-y matrix of display elements.

In some implementations, the driver controller 629, the array driver 622, and the display array 630 are appropriate for any of the types of displays described herein. For example, the driver controller 629 can be a conventional display controller or a bi-stable display controller (such as a light modulator display element controller). Additionally, the array driver 622 can be a conventional driver or a bi-stable display driver (such as a light modulator display element driver). Moreover, the display array 630 can be a conventional display array or a bi-stable display array (such as a display including an array of light modulator display elements). In some implementations, the driver controller 629 can be integrated with the array driver 622. Such an implementation can be useful in highly integrated systems, for example, mobile phones, portable-electronic devices, watches or small-area displays.

In some implementations, the input device 648 can be configured to allow, for example, a user to control the operation of the display device 640. The input device 648 can include a keypad, such as a QWERTY keyboard or a telephone keypad, a button, a switch, a rocker, a touch-sensitive screen, a touch-sensitive screen integrated with the display array 630, or a pressure- or heat-sensitive membrane. The microphone 646 can be configured as an input device for the display device 640. In some implementations, voice commands through the microphone 646 can be used for controlling operations of the display device 640.

The power supply 650 can include a variety of energy storage devices. For example, the power supply 650 can be a rechargeable battery, such as a nickel-cadmium battery or a lithium-ion battery. In implementations using a rechargeable battery, the rechargeable battery may be chargeable using power coming from, for example, a wall socket or a photo-voltaic device or array. Alternatively, the rechargeable battery can be wirelessly chargeable. The power supply 650 also can be a renewable energy source, a capacitor, or a solar cell, including a plastic solar cell or solar-cell paint. The power supply 650 also can be configured to receive power from a wall outlet.

In some implementations, control programmability resides in the driver controller 629 which can be located in several places in the electronic display system. In some other implementations, control programmability resides in the array driver 622. The above-described optimization may be implemented in any number of hardware and/or software components and in various configurations.

To achieve higher brightness and greater power savings for a display device, such as display device 640, the aperture ratio of a given pixel or an array of pixels in the display array 630 may be increased. The aperture is an area on a display that is allocated for letting light pass. The aperture may refer to a slot in the aperture plate. Within a given pixel, the ratio of the area of the aperture, e.g., a slot or slots, to the pixel size is the aperture ratio. To improve imaging characteristics (e.g., contrast ratio, image sharpness and color purity) for a display device, such as display device 640, the light modulator transition time (e.g., moving the light modulator from an open position to a closed position) may be shortened. For example, a shortened light modulator transition time from an open position to a closed position reduces the risk that light leaks out of a pixel before the corresponding light modulator reaches a fully closed state. Systems, apparatuses and methods are provided for creating asymmetric travel for respective light modulating bodies in a display device and thereby allowing for one or more of the following advantages: increased total travel distance of the light modulating body and thereby increased the aperture ratio of the display, shorter transition time of the light modulating body (e.g., moving from an open position to a closed position), and reduced driving voltage required to actuate the light modulating bodies without affecting or increasing the transition time.

For example, in one implementation a light modulating assembly, such as shutter assembly 400, includes a body coupled between two actuators. Each actuator is independently controlled. A first actuator serves to move the body to an open position, and a second opposing actuator serves to move the body to a closed position. Both actuators include compliant beam electrode actuators. The actuators move the body by driving the body in a plane substantially parallel to an aperture layer, including one or more apertures, over which the body is suspended. The total travel distance of the light modulating body includes the distance the body travels from the open position to the closed position, and vice-versa. In one implementation, the travel distance of a light modulating body is asymmetric, which means from a neutral position, the body travels a greater distance in a first direction than in a second direction.

In one implementation, the body travels a greater distance from the neutral position to an open position, where light is allowed to pass through an aperture, than it does from the neutral position to a closed position, where light is blocked from passing through an aperture. In other implementations, the body travels a greater distance from the neutral position to a closed position, than it does from the neutral position to an open position.

The asymmetric travel of the light modulating bodies allows for an increase in aperture ratio without requiring longer light modulator transition times, particularly when moving from an open position to a closed position. For example, a symmetric light modulator assembly having a total travel distance of 10 µm (5 µm from the neutral position to the closed position, and 5 µm from the neutral position to the open position), a close transition time, $t_1$, and a driving voltage, $V_1$, can be altered to increase the total travel distance to 11 µm while keeping the substantially the same close transition time, $t_1$, and driving voltage, $V_1$. This may be accomplished by designing the light modulator assembly to achieve asymmetric travel: the light modulator assembly having a total travel distance of 11 µm, including 4 µm from the neutral position to the closed position, and 7 µm from the neutral position to the open position. In this example, the increase in the total travel distance (from 10 µm to 11 µm) allows for an overall increase in the aperture ratio of the display device. The asymmetric travel (4 µm from the neutral position to the closed position, and 7 µm from the neutral position to the open position) allows for maintaining substantially the same transition time, $t_1$, from the open position to the closed position, and driving voltage, $V_1$, as light modulator assembly having a smaller total travel distance of only 10 µm.

As discussed above, the asymmetric travel of the light modulating body also allows for an overall decrease in the light modulator transition time because the light modulator assembly is able to travel a shorter distance from the neutral position to a closed position. For example, a symmetric light modulator assembly having a total travel distance of 10 µm (5 µm from the neutral position to the closed position, and 5 µm from the neutral position to the open position) a close transition time, $t_1$, and a driving voltage, $V_1$, can be designed to have asymmetric travel (e.g., 4 µm from the neutral position to the closed position, and 6 µm from the neutral position to the open position). This allows for the transition time from the open position to the closed position to be decreased to $t_2$, where $t_2$ is less than $t_1$, while substantially maintaining the drive voltage at $V_1$.

Figure 8:
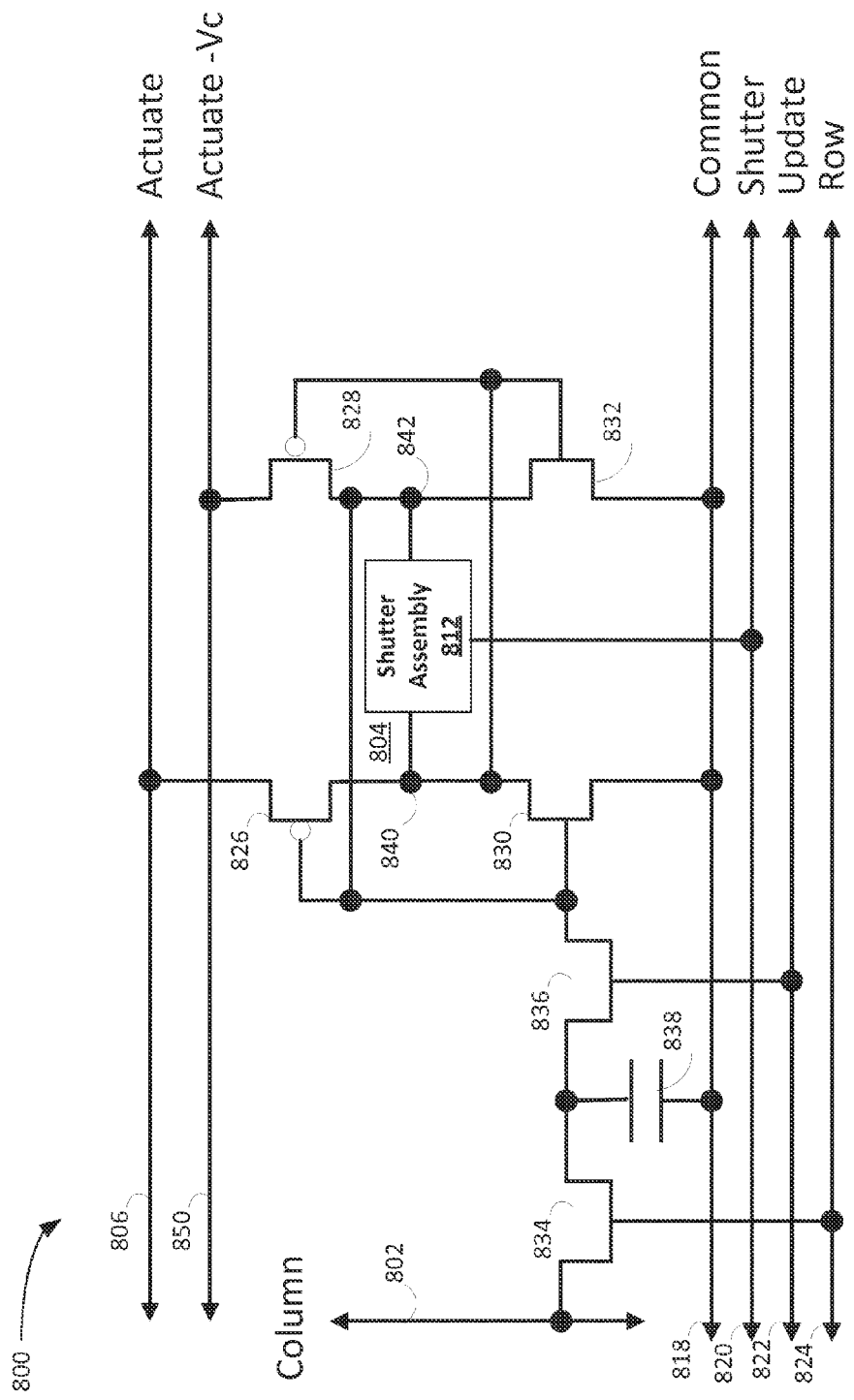
FIG. 8 is a schematic diagram of a portion of a control matrix for controlling a light modulator using different drive voltages for open and close operations.
Figure 9:
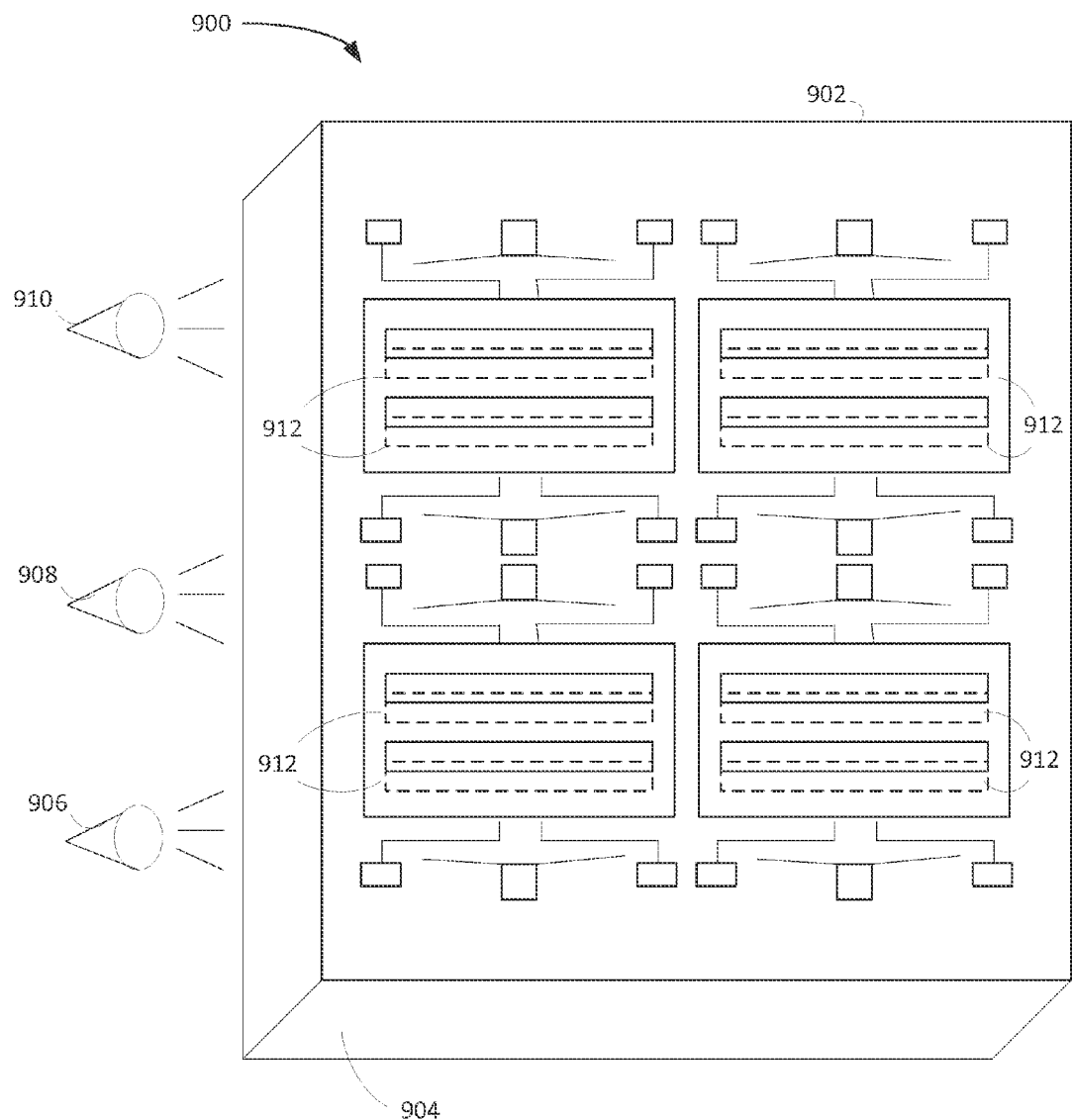
FIG. 9 is a plan view of one example of a portion of a display device.

The asymmetric travel of the light modulating body may also allow for a decrease in the voltage required for driving the light modulating body because a lower driving voltage could be applied to an actuator for driving the light modulator assembly to a closed position while maintaining a desired transition time. Alternatively, a lower driving voltage could be applied to an actuator for driving the light modulator assembly to an open position which may increase the transition time to the open position which may not adversely affect performance of the light modulator. For example, a symmetric light modulator assembly having a total travel distance of 10 µm (5 µm from the neutral position to the closed position, and 5 µm from the neutral position to the open position) a close transition time, $t_1$, and a driving voltage, $V_1$, can be designed to have asymmetric travel (e.g., 4 µm from the neutral position to the closed position, and 6 µm from the neutral position to the open position). This allows for decreasing the drive voltage to $V_2$, where $V_2$ is less than $V_1$, while substantially maintaining the transition time from the open position to the closed position at $t_1$. FIGS. 7-9 show some implementations of a light modulating assembly designed for asymmetric travel.

Figure 7A:
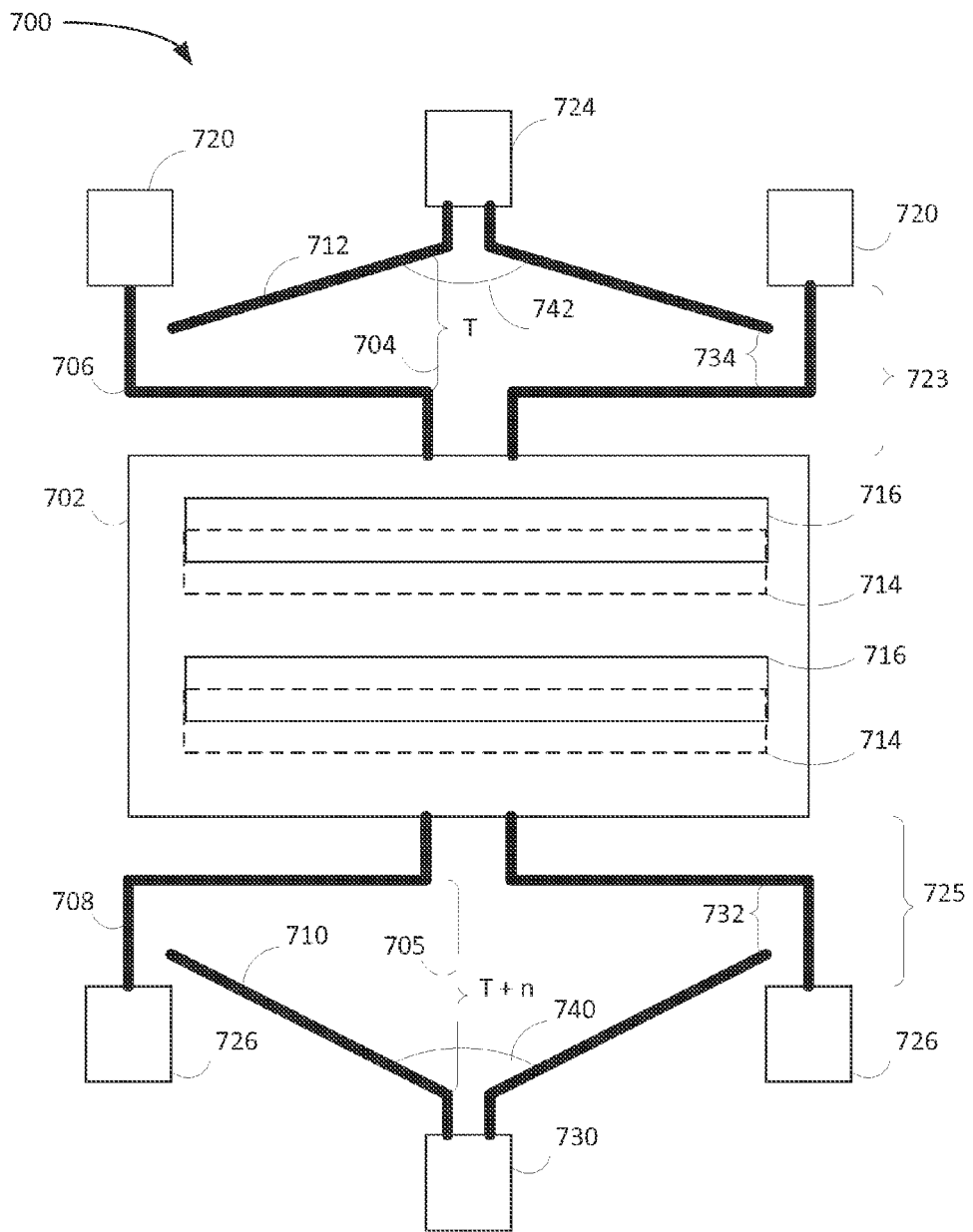
FIG. 7A is a plan view of one example of a light modulating assembly in a neutral position.

FIG. 7A is a plan view of one example of a light modulating assembly 700 disposed in a neutral position. Light modulating assembly 700 includes a body 702 coupled between a first actuator 723 and a second actuator 725. The body 702 depicted in FIG. 7A is a shutter-based light modulator, such as the light modulator depicted in FIGS. 4A and 4B, however body 702 may be any body that can be moved from a neutral position, in two opposing directions. The first actuator 723 and second actuator 725 may be an electrostatic actuator as described above with respect to FIGS. 4A-4B. The first actuator 723 includes compliant electrode 706 and compliant electrode 712. The second actuator 725 includes compliant electrode 708 and compliant electrode 710. The compliant electrodes 708 and 706 include beams that may be referred to as a compliant support beams. The compliant electrodes 710 and 712 include beams extending from the anchors 730 and 724 respectively that may be referred to as compliant actuator beams or drive beams. In certain implementations, a compliant electrode can be conductive. Compliant electrode 706 is connected to a pair of anchors 720. Electrode 712 is connected to electrode anchor 724. Compliant electrode 708 is connected to a pair of anchors 726. Electrode 710 is connected to electrode anchor 730. The anchors 720-730 are coupled to a substrate (not shown) and may help to suspend the body 702 a distance above the surface of a substrate. In the example shown in FIG. 7A, the distance 705 between the compliant electrode 708 and the anchor 730 is greater than the distance 704 between the compliant electrode 706 and the electrode anchor 724. In certain implementations the distance 704 may range from 2-25 µm. In the example shown in FIG. 7A, the tip gap 732, the distance between one tip of electrode 710 and the compliant electrode 708, is substantially the same as the tip gap 734, the distance between one tip of the electrode 712 and the compliant electrode 706. In certain implementations, the tip gap 732 may be larger or smaller than the tip gap 734. The tip gap 732 or 734 may be, for example, about 2 µm. The tip gap 732 or 734 may be a distance of about 1-5 µm.

The body 702 includes at least one opening 716 configured to align relative to at least one aperture 714 (shown as dashed lines) formed in an aperture plate. The apertures 714 of FIG. 7A are rectangular in shape, generally matching the shape of the openings 716. In certain implementations, each aperture has at least one edge around its periphery. For example, the rectangular apertures 714 have four edges. In alternative implementations in which circular, elliptical, oval, or other curved apertures are formed, each aperture may have only a single edge. In other implementations the apertures need not be separated or disjoint in the mathematical sense, but instead can be connected. That is to say, while portions or shaped sections of the aperture may with a respective body, several of these sections may be connected such that a single continuous perimeter of the aperture is shared by multiple bodies. In order to allow light with a variety of exit angles to pass through apertures 714 in the open state, the width or size of openings 716 may be larger than a corresponding width or size of apertures 714. In order to effectively block light from escaping in the closed state, the light blocking portions of the body 702 may be arranged to be wider than the width of the apertures 714.

The dual-actuator assembly depicted in FIG. 7A may function as described with respect to the dual-actuator assemblies in FIGS. 4A-4B. FIG. 7A depicts the light modulating assembly 700 in a neutral position where no outside forces are acting on the body 702. Both compliant electrodes 706 and 708 are in a resting position. In FIG. 7A the opening 716 of body 702 is partially overlapping the aperture 714. In certain implementations, the opening 716 may not overlap the aperture 714 at all while in the neutral position. In certain implementations, the opening 716 may substantially completely overlap the aperture 714 while in the neutral position.

Figure 7B:
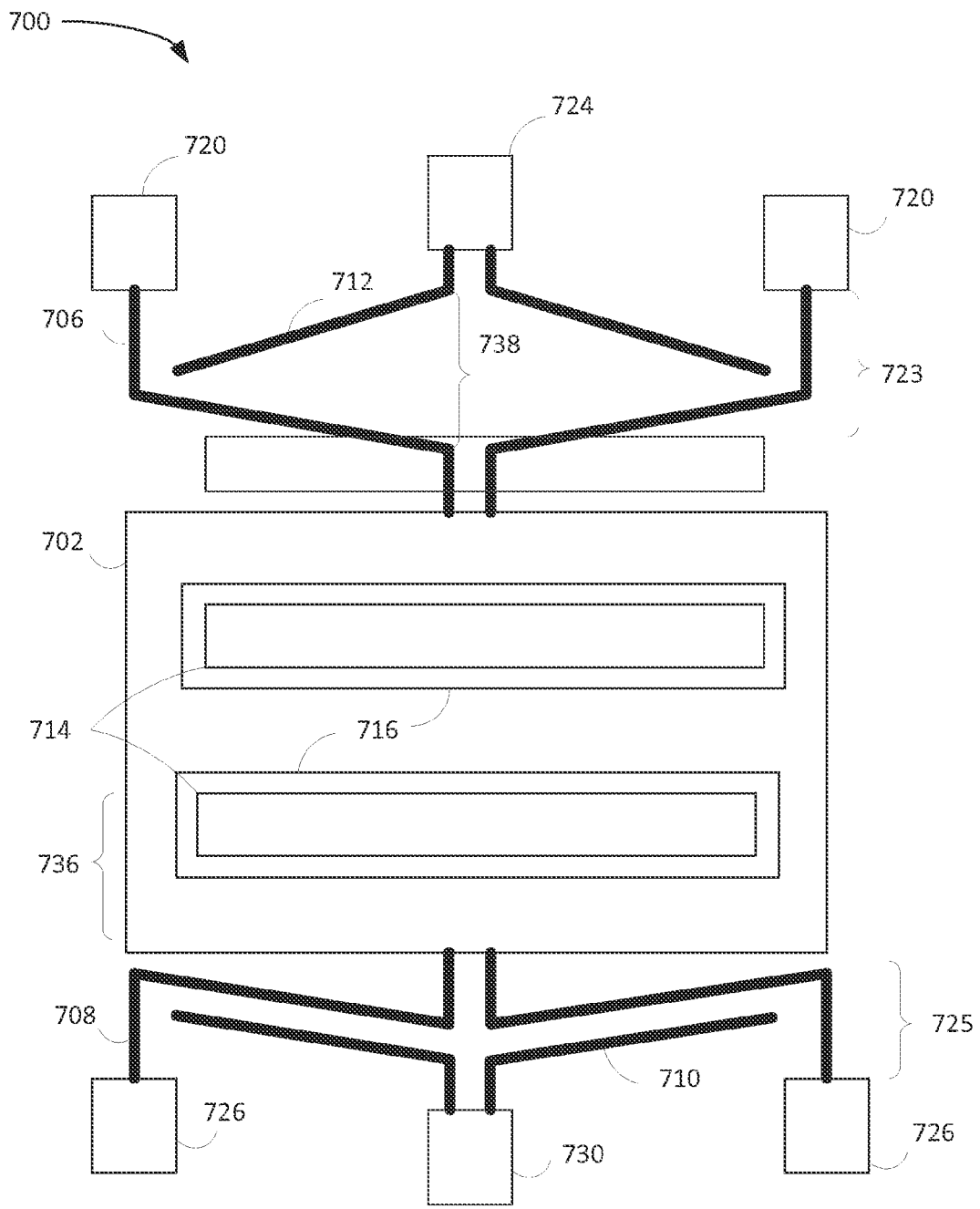
FIG. 7B is a plan view of one example of a light modulating assembly in a first position.

FIG. 7B is a plan view of one example of a light modulating assembly 700 in a first position. FIG. 7B depicts the body 702 after it has moved a distance 736 from the neutral position shown in FIG. 7A. As shown in FIG. 7B, the body 702 has moved away from first actuator 723. In FIG. 7B the opening 716 of body 702 is larger than the aperture 714. In some implementations, the opening 716 of body 702 may be the same size and therefore be able to fully align with aperture 714. In other implementations, the opening 716 may be smaller than aperture 714. In some implementations, the opening 716 may partially overlap the aperture 714 such as illustrated in FIG. 7A. In certain implementations, the first position as depicted in FIG. 7B is an open position, where the body 702 allows at least some light from a light source to pass through the aperture 714.

Figure 7C:
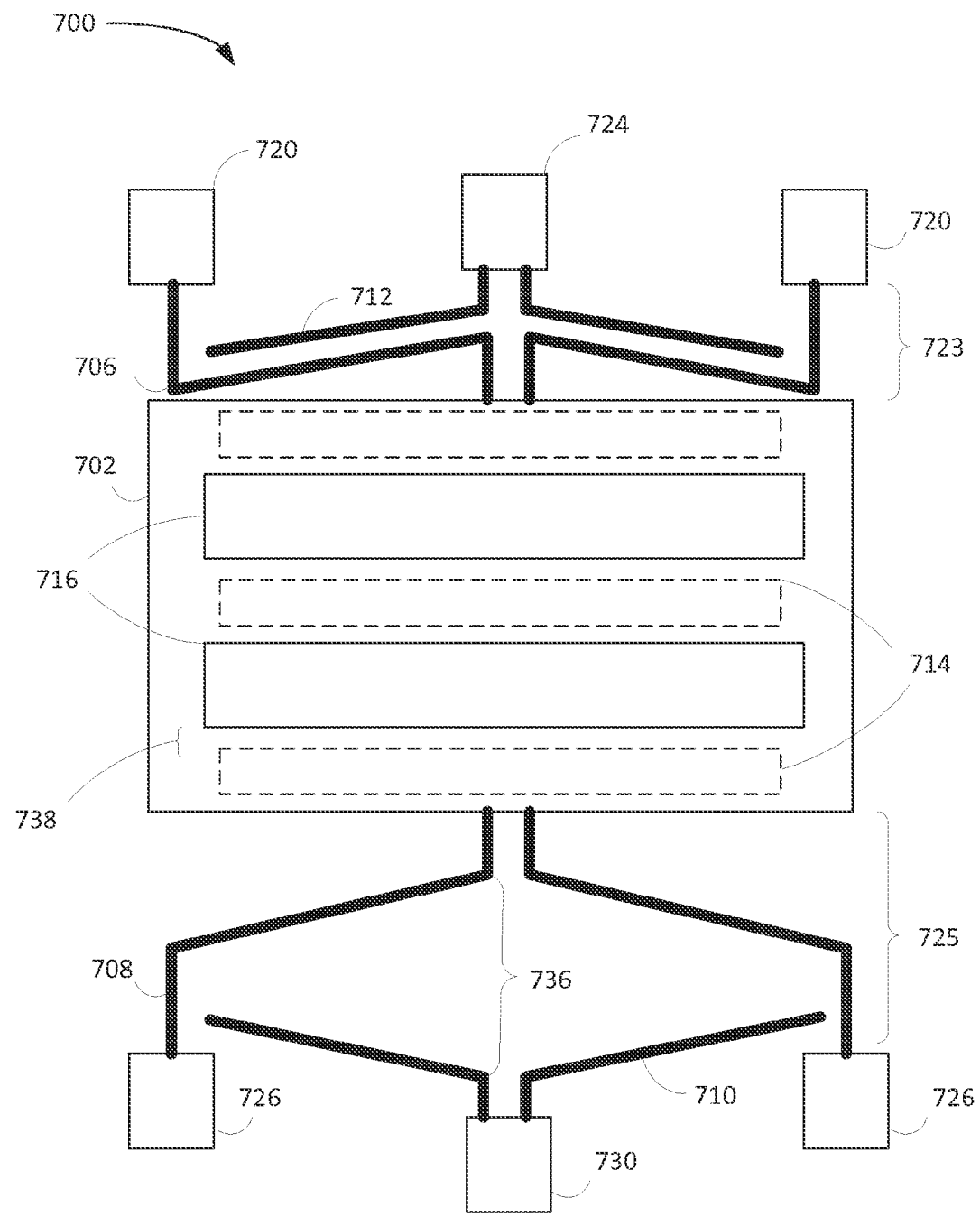
FIG. 7C is a plan view of one example of a light modulating assembly in a second position.

FIG. 7C is a plan view of one example of a light modulating assembly 700 in a second position. FIG. 7C depicts body 702 after it has moved a distance 738 from the neutral position shown in FIG. 7A. As shown in FIG. 7C, the body 702 has moved toward the first actuator 723. In FIG. 7C the opening 716 of body 702 has substantially no overlap with the aperture 714. In some implementations the opening 716 of body 702 may partially overlap the aperture 714. In certain implementations, the second position as depicted in FIG. 7C is a closed position, where the light modulating assembly completely blocks light from a light source passing through the aperture 714.

As shown in FIGS. 7A-7C, the distance 736 between the neutral position (shown in FIG. 7A) and the first position (shown in FIG. 7B) is greater than the distance 738 between neutral position (shown in FIG. 7A) and the second position (shown in FIG. 7C). Thus, the travel distance of body 702 from a neutral position to a first position and from the neutral position to a second position is not equal and therefore asymmetric. Furthermore, the body 702 travels a greater distance with respect to the aperture 714 when moving the first distance 736 than when moving the second distance 738. However, in some implementations the body 702 travels a greater distance with respect to the aperture 714 when moving the second distance 738 than when moving the first distance 736. The total travel distance of the body 702 in FIGS. 7A-7C is the distance 736 plus the distance 738, i.e., the distance the body travels from the first position of FIG. 7B to the second position of FIG. 7C. The body 702 also travels this total travel distance when going from the second position of FIG. 7C back to the first position of FIG. 7B. In certain implementations, the asymmetric travel of the body 702 from a neutral position allows the total travel distance of the body 702 (e.g., from an open to closed position, or vice-versa) to be increased while still maintaining a set transition time for body 702. As a result of the travel distance being increased, the size of the aperture 714 may be increased for multiple pixels in the array of pixels, thereby allowing the aperture ratio of the display to be increased while maintaining a set transition time for body 702 (e.g., moving from open position to closed position). Thus, asymmetric travel allows for a device to be designed with a longer travel distance without affecting or increasing the transition time, at least in one direction. The greater aperture ratio results in higher display brightness and power savings.

Referring back to FIG. 7A, in certain implementations, the asymmetric travel of a light modulating body may be achieved by making the spring-electrode gap 705 of the second actuator 725 larger than the spring-electrode gap 704 of the opposing first actuator 723. The spring-electrode gap may be made large by moving electrode anchor 730 away from body 702. Increasing one or both spring-electrode gaps 704 and 705 can increase the total travel distance of body 702. For example, as shown in FIG. 7A, electrode anchor 730 may be placed a greater distance 705 from compliant electrode 708 than the distance 704 between electrode anchor 724 and compliant electrode 706. In the example shown in FIG. 7A, the electrode 710 is longer than the electrode 712 to maintain a substantially equal tip gap 732 and 734. However, in certain implementations, the electrode 710 may be the same size or shorter than the electrode 712. Also, in FIG. 7A, the angle 740 between the beams of electrode 710 is smaller than the angle 742 between the beams of electrode 712. However, in certain implementations, the angle 740 may be the same size or larger than the angle 742.

In certain implementations, the actuating voltage applied to one actuator such as actuator 723 is different than the actuating voltage applied to the other actuator 725. The actuating voltage applied to electrode 710 may be set lower than the voltage applied to electrode 712. For example, the actuating voltage $V_{at}$ may be set to about 25 volts and applied to electrode 712, while the voltage applied to electrode 710 is reduced by an amount Vc such that the voltage applied to electrode 710 is $V_{at}$-Vc. In this way, the amount of power used to move the shutter 702 to the open position is reduced, thereby, reducing overall power consumption. While the reduced voltage results in a slower actuating time of the shutter to the open position, the reduced open actuating time does not affect the close actuating time and, therefore, does not adversely affect shutter performance nor optical performance of the display. Alternatively, the reduced voltage $V_{at}$-Vc may be applied to electrode 712 while the voltage $V_{at}$ is applied to electrode 710. In this way, the actuating speed is increased for the actuator 725 to possibly compensate for the longer distance of travel T+n from the shutter's neutral position. While the application of different actuating voltages may be applied to a light modulating assembly 700 having a body 702 that asymmetrically travels from a neutral position to open and closed positions, the application of different actuating voltages may be applied to a light modulator assembly 400 where a body 406 travels substantially symmetrically from a neutral to open and closed positions.

FIG. 8 is a schematic diagram of a portion of a control matrix 800 for controlling a light modulator using different drive voltages for open and close operations. Control matrix 800 controls an array of pixels 804 that include dual-actuator shutter assemblies 812. Dual actuator shutter assemblies, such as shutter assembly 400 and 700, are shutter assemblies that include separate shutter-open and shutter-close actuators. Although only one pixel 804 is illustrated in FIG. 8, it is understood that the control matrix extends and incorporates a large number of rows and columns of similar pixels. In addition, the control matrix 800 may be used with any suitable type of MEMS modulators and actuators, such as elastic modulators, single-actuator modulators, non-shutter based modulators, and modulators 400 and 700 without departing from the scope of the disclosure. The control matrix 800 includes column line interconnect 802 for each column of pixels 804 in the control matrix 800. The actuators in the shutter assemblies 804 can be made either electrically bi-stable or mechanically bi-stable. The light control matrix 800 is depicted as having a single MEMS light modulator per pixel. Other embodiments are possible in which multiple MEMS light modulators are provided in each pixel, thereby providing the possibility of more than just binary "on' or "off" optical states in each pixel. Certain forms of coded area division gray scale are possible where multiple MEMS light modulators in the pixel are provided, and where apertures, which are associated with each of the light modulators, have unequal areas.

The control matrix 800 includes a plurality of lines, herein referred to as "global lines" common to the entire display, composed of a plurality of identical pixels arranged in a row and column fashion. These global lines include the actuate line interconnect 806, the common line interconnect 818, the shutter line interconnect 820, and the update line interconnect 822 In some implementations, these global lines are operated as one node across an entire display. For example, the entire update node across the display, or the entire actuate node across the display is changed at the same time. In some implementations, these global line interconnects can be grouped into pixel sub-groups. For example, each odd row of pixels may have their global lines connected, and each even row of pixels' global lines may be separately connected so that odd rows may be operated independently of even rows. The control matrix 800 includes a row line 824, which is unique to each row arrangement of pixels and a column line 802, which is unique to each column arrangement of pixels. Each pixel 804 in the control matrix includes a data loading transistor 834, a data store capacitor 838, an update transistor 836, actuator nodes 840 and 842, and a dual inverter latch. In control matrix 800, the data store capacitor 838 is connected to the common line interconnect 818. However, in some implementations, the data store capacitor 838 may be connected to the shutter line interconnect 820. In some implementations, the common line interconnect 818 can serve as the next row's row interconnect 824, and therefore eliminate the common line interconnect 818 altogether.

The dual inverter latch includes a first inverter comprised of transistors 826 and 830, and a second inverter comprised of transistors 828 and 832. Shutter assemblies 812 include electrostatic actuators, similar to actuators 723 and 725 of shutter assembly 700, connected to the actuator nodes 840 and 842. When a voltage difference equal to or greater than an actuation voltage, also referred to as a charging voltage or $V_{at}$, is imposed between the actuators and the shutter, the shutter assembly can be driven into an open state allowing passage of light, or a closed state, blocking the passage of light. The control matrix 800 makes use of two complementary types of transistors: both p-channel and n-channel transistors. It is therefore referred to as a complementary MOS control matrix or a CMOS control matrix. While the data loading transistor 834, update transistor 836 and the lower transistors of the cross-coupled inverters 830 and 832 are made of the nMOS type, the upper transistors of the cross-coupled inverter 826 and 828 are made of the pMOS type of transistor. Those of skill in the art will recognize that in other implementations, the types of CMOS transistors can be reversed (i.e., pMOS switched with nMOS), or other types of transistors may be used (i.e., BJT, JFET or any other suitable type of transistor).

In some implementations, actuate line 806 is connected to a voltage source that is maintained equal to or greater than $V_{at}$. The shutter line 820 is maintained near to the ground potential. In some implementations, the shutter polarity may be maintained at the full drive voltage (i.e., approximately 25 volts). In certain configurations, the polarity of the shutter may be periodically alternated between one or more potentials as necessary. For example, the shutter may be alternated between 25 volts and 0 volts after each full video frame, or in other cases, more or less frequently. The shutter polarity may be controlled by applying the necessary voltage to the shutter line interconnect 820. In some implementations, the polarity of the data is alternated, as well, corresponding to the shutter potential being alternated.

Each actuator node 840 and 842 is connected to actuate line 806 depending on the "on/off" state of its respective transistor 826 and 828. For example, when the transistor 826 connected to the left actuator node 840 is in an "on" state, charge is allowed to flow from the actuate line 806 to the actuator node 840. Then, a voltage of approximately $V_{at}$ will be imposed between the actuator connected to the actuator node 840 and the shutter (assuming the shutter is at common potential), and the shutter will be driven into its desired state.

A similar process occurs when transistor 826 is in an "off" state and transistor 828 is in an "on" state. However, in this instance, when the transistor 826 is connected to the left actuator node 840 is in an "on" state, a charge is allowed to flow from the actuate –Vc line 850 to the actuator node 842. Then, a voltage of approximately $V_{at}$–Vc will be imposed between the actuator connected to the actuator node 842 and the shutter (assuming the shutter is at common potential), and the shutter will be driven into its desired state, which results in driving the shutter into the opposite state. In some implementations, a voltage of approximately $V_{at}$ will be applied to the actuator connected to the actuator node 540 and a similar voltage applied to the shutter, thereby creating a 0 volt potential between the shutter and actuator.

The control matrix 800 includes a data store capacitor 838. As described further below, the capacitor 838 stores, by means of stored charge, "data" instructions (e.g., open or close) that are sent by a controller, such as controller 156, to the pixel 804 as part of a data loading or writing operation. The voltage stored on the capacitor 838 determines, in part, the latch state of the dual inverter latch in control matrix 800.

During a data load operation, each row of the array is write-enabled in an addressing sequence. The voltage sources in control matrix 800 (not shown) apply a write-enabling voltage to the row line interconnect 824 corresponding to a selected row. The application of voltage to the row line interconnect 824 for the write-enabled row turns on the data-loading transistor 834 of the pixels 804 in the corresponding row line, thereby write enabling the pixels. While a selected row of pixels 804 is write-enabled, data voltage sources apply appropriate data voltages to the column interconnect 802 corresponding to each column of pixels 804 in the control matrix 800. The voltages applied to the column interconnects 802 are thereby stored on the data store capacitors 838 of the respective pixels 804. In certain implementations, the voltages applied to column interconnect 802 may be negative or positive (e.g., ranging from –5 to 5 volts).

The body depicted in light modulating assembly 700 may move transverse to a substrate and over apertures 714 to block or pass light. In certain implementations, the openings 716 of body 702 may align with the aperture 714 allowing light to pass through the aperture 714. In certain implementations, the openings 716 of body 702 may partially overlap the aperture 714 allowing some light to pass through the aperture, and blocking some light from passing through the aperture. In certain implementations, the openings 716 of body 702 may substantially not align at all with the apertures 714 thereby blocking all light from passing through the apertures 714.

For example, while in the first position, body 702 may not overlap with aperture 714 at all, thereby allowing light to pass through the aperture 714. In certain implementations, while in the first position, body 702 may partially overlap aperture 714, thereby allowing some light to pass through the aperture 714 and also blocking some light from passing through aperture 714.

FIG. 9 is a plan view of one example of a portion of a display device 900. In particular, FIG. 9 presents a simplified plan view of the display depicted in FIG. 5 that includes an array of light modulators assemblies 902, such as light modulator assembly 400 described with respect to FIGS. 4A and 4B, disposed on top of substrate 904. The array of light modulator assemblies 902 are arranged in pixels in a display and may function as described with respect to FIGS. 7A-C. The light modulating assemblies 902 may include light modulating bodies as described with respect to FIGS. 7A-C, or any of the light modulators described herein. For example, the light modulating assemblies 902 of FIG. 9 include different sized compliant electrodes. However, in various implementations, the light modulating assemblies 902 may include a configuration as shown and described with respect to light modulating assembly 700 of FIG. 7A. In one implementation, the substrate 904 is made of a transparent material, e.g. glass or plastic, and functions as a light guide for evenly distributing light from light sources 906, 908, and 910 throughout a display plane. The example shown in FIG. 9 includes three light sources, however more or less light sources may be used as necessary. In one example, the light sources 906, 908, and 910 may be of different colors, e.g. red, green, and blue light sources respectively.

A number of different types of light sources 906, 908, and 910 can be employed in the display device 900, including without limitation: incandescent light sources, fluorescent light sources, lasers, or light emitting diodes (LEDs). Further, light sources 906, 908, and 910 of display device 900 can be combined into a single assembly containing multiple light sources. For example, a combination of red, green, and blue LEDs can be combined with or substituted for a white LED in a small semiconductor chip, or assembled into a small multi-light source package. Similarly, each light source can represent an assembly of 4-color LEDs, for instance a combination of red, yellow, green, and blue LEDs.

The array of light modulating assemblies 902 function to modulate light emitted by light sources 906, 908, and 910. In certain implementations, the array of light modulating assemblies 902 modulate light originating from the ambient. By use of electrical signals from an associated control matrix, such as control matrix 300 described in FIG. 3, the array of light modulating assemblies 902 can be set into either an open or a closed state in a manner described with respect to FIGS. 7A-C. In the open state, the light modulating bodies 902 allow light from the light sources 906, 908, and 910 to pass through to a viewer, thereby forming a direct view image. In certain implementations, the light modulating assemblies 902 may reflect light from an outside light source or from the ambient to a viewer to form an image.

In display device 900, the light modulating assemblies 902 are formed on the surface of substrate 904 that faces toward a viewer. In other implementations the substrate 904 can be reversed, such that the light modulators are formed on a surface that faces away from a viewer. In certain implementations, an aperture layer is formed directly onto the top surface of the substrate 904. The aperture layer includes the apertures 912. In other implementations the aperture layer, including apertures 912, is disposed on a separate substrate (not shown), other than the substrate on which the array of light modulating bodies 902 is formed. The light modulating assemblies 902 modulate light with respect these apertures in a similar manner as described with respect to FIGS. 7A-C.

Variations and modifications can be made to the implementations described above without substantially departing from the principles of the present application. Such variations and modifications are also intended to be included within the scope of the appended claims. Therefore, the forgoing implementations are to be considered in all respects illustrative, rather than limiting of the application.

What is claimed is:

1. An electromechanical device, comprising:
    a first actuator,
    a second actuator, and
    a body coupled between the first and second actuators, the body being movable between a first position, a second position, and a neutral position between the first and second positions, and
    wherein a first distance between the neutral position and the first position is greater than a second distance between the neutral position and the second position.

2. The electromechanical device of claim 1, wherein a time for moving the body from the second position to the first position is greater than a time for moving the body from the first position to the second position.

3. The electromechanical device of claim 1, wherein the first and second actuators include electrostatic actuators.

4. The electromechanical device of claim 1, further comprising:
    a control matrix arranged to apply a first voltage to the first actuator and a second voltage to the second actuator, the first voltage being different than the second voltage.

5. The electromechanical device of claim 1, wherein the first actuator is configured differently from the second actuator based on the difference in the first and second distances.

6. The electromechanical device of claim 1, wherein the first actuator includes:
    a first compliant electrode connected between the body and a first set of anchors, and
    a first electrode opposing the first compliant electrode and connected to a first electrode anchor,
    and the second actuator includes:
    a second compliant electrode connected between the body and a second set of anchors, and
    a second electrode opposing the second compliant electrode and connected to a second electrode anchor, and wherein a distance between the second compliant electrode and the second electrode anchor is greater than a distance between the first compliant electrode and the first electrode anchor.

7. The electromechanical device of claim 6, wherein a length of the second compliant electrode is greater than a length of the first compliant electrode.

8. The electromechanical device of claim 1, wherein the body includes a shutter.

9. The electromechanical device of claim 8, further comprising a substrate, wherein the shutter moves transverse to the substrate.

10. The electromechanical device of claim 1, wherein the body moves the first distance away from the first actuator, and moves the second distance toward the first actuator.

11. The electromechanical device of claim 10, further comprising an aperture and a light source, wherein in the first position, the body allows light from the light source to pass through the aperture, and in the second position the body at least partially blocks light from the light source from passing through the aperture.

12. The electromechanical device of claim 11, wherein in the neutral position, the body at least partially blocks light from passing through the aperture.

13. The electromechanical device of claim 11, wherein the body travels a greater distance in relation to the aperture when moving from the neutral position to the first position than when moving from the neutral position to the second position.

14. The electromechanical device of claim 1, further comprising:
    an array of first actuators, second actuators and bodies coupled between the respective first actuators and second actuators arranged in pixels in a display;
    a processor that is configured to communicate with the display, the processor being configured to process image data; and
    a memory device that is configured to communicate with the processor.

15. The electromechanical device of claim 14, wherein an aperture ratio of the display is greater than a display having the first distance equal to the second distance.

16. The electromechanical device of claim 14, further comprising:
    a driver circuit configured to send at least one signal to the display; and
    a controller configured to send at least a portion of the image data to the driver circuit.

17. The electromechanical device of claim 14, further comprising:
    an image source module configured to send the image data to the processor, wherein the image source module comprises at least one of a receiver, transceiver, and transmitter.

18. The electromechanical device of claim 14, further comprising:
an input device configured to receive input data and to communicate the input data to the processor.

19. An apparatus, comprising:
a first actuator means and a second actuator means for moving a light modulating means coupled between the first and second actuator means, the light modulating means being movable between a first position, a second position, and a neutral position between the first and second positions, and
wherein a first distance to move the light modulating means between the neutral position and the first position is greater than a second distance to move the light modulating means between the neutral position and the second position.

20. The apparatus of claim 19, wherein the light modulating means moves the first distance away from the first actuator means, and moves the second distance toward the first actuator means.

21. The apparatus of claim 19, wherein a time for moving the light modulating means from the second position to the first position is greater than a time for moving the light modulating means from the first position to the second position.

22. The apparatus of claim 19, further comprising a substrate means, wherein the light modulating means moves transverse to the substrate means.

23. The apparatus of claim 19, wherein the first actuator means is configured differently from the second actuator means based on the difference in the first and second distances.

24. The apparatus of claim 19, further comprising an aperture means for passing light, wherein in the first position, the light modulating means allows light to pass through the aperture means, and in the second position the light modulating means at least partially blocks light from passing through the aperture means.

25. The apparatus of claim 24, wherein in the neutral position, the light modulating means at least partially blocks light from passing through the aperture means.

26. The apparatus of claim 19, wherein the first actuator means includes:
a first compliant electrode means connected between the light modulating means and first set of anchor means, and
a first electrode means opposing the first compliant electrode means and connected to a first electrode anchor means, and
the second actuator means includes:
a second compliant electrode means connected between the light modulating means and a second set of anchor means, and
a second electrode means opposing the second compliant electrode means and connected to a second electrode anchor means,
wherein a distance between the second compliant electrode means and the second electrode anchor means is greater than a distance between the first compliant electrode means and the first electrode anchor means.

27. The apparatus of claim 26, wherein a length of the second compliant electrode means is greater than a length of the first compliant electrode means.

28. An electromechanical device, comprising:
a substrate having an aperture,
a light source for providing light,
a first actuator,
a second actuator, and
a body coupled between the first and second actuators, the body being movable relative to the aperture between a first position for allowing light from the light source to pass through the aperture, a second position for at least partially blocking the light from passing through the aperture, and a neutral position between the first and second positions, and
wherein a first distance between the neutral position and the first position is greater than a second distance between the neutral position and the second position.

29. The electromechanical device of claim 28, wherein the first actuator is configured differently from the second actuator based on the difference in the first and second distances.

* * * * *